(12) United States Patent  
Handschy et al.

(10) Patent No.: US 8,107,344 B2
(45) Date of Patent: *Jan. 31, 2012

(54) PHASE MASKS FOR USE IN HOLOGRAPHIC DATA STORAGE

(75) Inventors: Mark A. Handschy, Boulder, CO (US); Michael J. O'Callaghan, Louisville, CO (US); Christopher M. Walker, Boudler, CO (US)

(73) Assignee: Micron Technology, Inc., Boise, ID (US)

( * ) Notice: Subject to any disclaimer, the term of this patent is extended or adjusted under 35 U.S.C. 154(b) by 125 days.

This patent is subject to a terminal disclaimer.

(21) Appl. No.: 12/639,821

(22) Filed: Dec. 16, 2009

(65) Prior Publication Data

US 2010/0091631 A1 Apr. 15, 2010

Related U.S. Application Data

(62) Division of application No. 11/046,197, filed on Jan. 27, 2005, now Pat. No. 7,656,768.

(60) Provisional application No. 60/539,620, filed on Jan. 27, 2004, provisional application No. 60/540,737, filed on Jan. 30, 2004.

(51) Int. Cl.
  *G11B 7/00* (2006.01)
(52) U.S. Cl. ............... 369/112.02; 369/112.01; 369/103
(58) Field of Classification Search ........................ None
See application file for complete search history.

(56) References Cited

U.S. PATENT DOCUMENTS

| | | |
|---|---|---|
| 3,946,370 A | 3/1976 | Schmidt et al. |
| 3,946,379 A | 3/1976 | Lippman |
| 4,952,010 A | 8/1990 | Healey et al. |
| 5,182,665 A | 1/1993 | O'Callaghan et al. |
| 5,212,583 A | 5/1993 | Vali et al. |

(Continued)

FOREIGN PATENT DOCUMENTS

EP 0450644 A2 10/1991

(Continued)

OTHER PUBLICATIONS

Hong, John, et al., "Influence of phase masks on cross talk in holographic memory," Optics Letters, vol. 21, No. 20, Oct. 15, 1996, pp. 1694-1696.

(Continued)

*Primary Examiner* — Lixi C Simpson
(74) *Attorney, Agent, or Firm* — Robert G. Crouch; Marsh Fischmann & Breyfogle LLP

(57) ABSTRACT

A spatial light modulator (SLM) having a phase mask that is provided as an internal component thereof. The phase mask can be provided as a multilevel surface of relatively higher index of refraction material on an inner surface of a transmissive cover window or as a separate transmissive window between the cover window and the pixels of the SLM. If the phase mask is to be used with a liquid crystal SLM, then it may be desirable to planarize the surface of the cover window contacting the liquid crystal by providing a layer of relatively lower index of refraction material adjacent the multilevel surface. The phase mask can also be provided on the transmissive cover window by patterned ion deposition, exposing patterned light to a photopolymeric material, or in some other suitable fashion. Arranging for the pixel electrodes to be at one of multiple levels rather than lying in an exactly planar relationship can also effectively create the phase mask.

16 Claims, 7 Drawing Sheets

U.S. PATENT DOCUMENTS

| | | | |
|---|---|---|---|
| 5,312,513 A | 5/1994 | Florence et al. | |
| 5,477,354 A | 12/1995 | Schehrer | |
| 5,552,916 A | 9/1996 | O'Callaghan et al. | |
| 5,748,164 A | 5/1998 | Handschy et al. | |
| 5,759,721 A | 6/1998 | Dhar et al. | |
| 5,784,141 A | 7/1998 | Chen et al. | |
| 5,801,800 A | 9/1998 | Wright et al. | |
| 5,808,800 A | 9/1998 | Handschy et al. | |
| 5,808,998 A | 9/1998 | Curtis et al. | |
| 5,812,288 A | 9/1998 | Curtis et al. | |
| 5,914,802 A * | 6/1999 | Stappaerts et al. | 359/279 |
| 5,995,251 A | 11/1999 | Hesselink et al. | |
| 6,031,643 A | 2/2000 | Burr | |
| 6,103,454 A | 8/2000 | Dhar et al. | |
| 6,124,920 A * | 9/2000 | Moseley et al. | 349/201 |
| 6,221,536 B1 | 4/2001 | Dhar et al. | |
| 6,281,993 B1 * | 8/2001 | Bernal et al. | 359/29 |
| 6,303,270 B1 | 10/2001 | Flaim et al. | |
| 6,407,724 B2 | 6/2002 | Waldern et al. | |
| 6,456,419 B1 | 9/2002 | Winker et al. | |
| 6,486,939 B2 | 11/2002 | Lin | |
| 6,618,116 B1 | 9/2003 | Murata et al. | |
| 6,674,555 B1 | 1/2004 | Curtis et al. | |
| 6,697,180 B1 * | 2/2004 | Wilson et al. | 359/11 |
| 6,995,882 B2 | 2/2006 | Horimai | |
| 7,064,883 B2 | 6/2006 | Payne et al. | |
| 7,085,026 B2 | 8/2006 | Horimai | |
| 7,130,092 B1 | 10/2006 | Horimai | |
| 7,327,470 B2 | 2/2008 | Arieli et al. | |
| 7,400,436 B2 | 7/2008 | Hendriks | |
| 7,411,708 B2 | 8/2008 | Waldman et al. | |
| 7,474,447 B2 | 1/2009 | Horimai | |
| 7,542,144 B2 | 6/2009 | Arieli et al. | |
| 7,652,809 B2 | 1/2010 | Waldman et al. | |
| 7,656,768 B2 | 2/2010 | Handschy et al. | |
| 2005/0207313 A1 | 9/2005 | Handschy et al. | |

FOREIGN PATENT DOCUMENTS

| | | |
|---|---|---|
| EP | 0822441 A2 | 4/1998 |
| EP | 0856767 A2 | 8/1998 |

OTHER PUBLICATIONS

Iwamoto, Akito, "Artificial diffuser for Fourier transform hologram recording," Applied Optics, vol. 19, No. 2, Jan. 15, 1980, pp. 215-221.

Brauer, Ralf, et al., "Diffusers in digital holography" J. Opt. Society of America, vol. 8, No. 3, Mar. 1991, pp. 572-578.

Dixit, S. N., et al., "Random phase plates for beam smoothing on the Nova laser," Applied Optics, vol. 32, No. 14, May 10, 1993, pp. 2543-2554.

Esaev, D. G., et al., "Continuous random phase mask," Sov. Phys. Tech. Phys. 22(9), Sep. 1977, pp. 1150-1152.

Gao, Qiang, et al., "Improvement to holographic digital data-storage systems with random and pseudorandom phase masks," Applied Optics, vol. 36. No. 20, Jul. 10, 1997, pp. 4853-4861.

Nakayama, Yoshikazu, et al., "Image quality in holography with a pseudorandom diffuser," Applied Optics, vol. 20, No. 13, Jul. 1, 1981, pp. 2178-2179.

Nakayama, Yoshikazu, et al., "Linear recording of Fourier transform holograms using a pseudorandom diffuser," Applied Optics, vol. 21, No. 8, Apr. 15, 1982, pp. 1410-1418.

Wang, Xu-Ming, et al., "Optical associative memory with bipolar edge-enhanced learning that uses a binary spatial light modulator and a BaTiO3 crystal," Applied Optics, vol. 34, No. 32, Nov. 10, 1995, pp. 7565-7572.

Armitage, David, et al., "Liquid-Crystal integrated silicon spatial light modulator" Applied Optics, vol. 31, No. 20, Jul. 10, 1992, pp. 3945-3949.

Domjan, Laszlo, et al., "Ternary phase-amplitude modulation with twisted nematic liquid crystal displays for Fourier-plane light homogenization in holographic data storage," Optik International Journal for Light and Electron Optics, 113, No. 9, 2002, pp. 382-390.

Domjan, Laszlo, "Generation of Spatial Light Distributions," PhD dissertation, Department of Atomic Physics, Faculty of Natural Sciences TU Budapest, 2004.

Jang, Ju-Seog, et al., "Optical representation of binary data based on both intensity and phase modulation with a twisted-nematic liquid-crystal display for holographic digital data storage," Optics Letters, vol. 26, No. 22, Nov. 15, 2001, pp. 1797-1799.

Kast, Brian A., et al., "Implementation of Ternary phase amplitude filters using a magnetoopitc spatial light modulator" Applied Optics, vol. 28, No. 6, Mar. 15, 1989.

Li, Kebin, et al., "Coherent micromirror arrays," Optics Letters, vol. 27, No. 5, Mar. 1, 2002, pp. 366-368.

O'Callaghan, Michael J., et al., "High-Tilt, High-Ps, de Vries FLCs for Analog Electro-Optic Phase Modulation," Ferroelectrics, 343:201-207, 2006.

Remenyi, Judit, et al., "Amplitude, phase, and hybrid ternary modulation modes of a twisted-nematic liquid-crystal display at 400 nm," Applied Optics, vol. 42, No. 17, Jun. 10, 2003, pp. 3428-3434.

John, Renu, et al., "A new balanced modulation code for a phase-image-based holographic data storage system," Journal of Opitcs A: Pure and Applied Optics, vol. 7, 2005, pp. 391-395.

John, Renu, et al., "Content-addressable Holographic Digital Data Storage Based on Hybrid Ternary Modulation with a Twisted-Nematic Liquid-Crystal Spatial Light Modulator," Optical Review, vol. 12, No. 3 (2005) pp. 155-160.

Senturia, Stephen D., "Programmable diffraction gratings and their uses in displays, spectroscopy, and communications," J. Microlith., Microfab, Microsystem 4(4), Oct.-Dec. 2005, pp. 041401-1-6.

De Bougrenet De La Tocnaye, J. L., et al., "Complex ampoitude modulation by use of liquid-crystal spatial light modulators," Applied Optics, vol. 36, No. 8, Mar. 1997, pp. 1730-1741.

Cohn, Robert W., "Fundamental properties of spatial light modulators for the approximate optical computation of Fourier transforms: a review," Opt. Eng., 40(11) Nov. 2001, pp. 2452-2463.

Davis, Jeffrey A., et al., "Encoding amplitude information onto phase-only filters," Applied Optics, vol. 38, No. 23, Aug. 10, 1999, pp. 5004-5013.

D'Have, K, et al., "Antiferroelectric liquid crystals with 45 degree tilt: new electro-optic effects in liquid crystals," Invited Paper, in Liquid Crystal Materials, Devices, and Flat Panel Displays, Ranganathan Shashidhar, Bruce Gnade, Editors, Proceedings of SPIE vol. 3955 (2000), pp. 33-44.

D'Have, Koen, "Application of antiferroelectric Liquid Crystals with High Tilt," Universiteit Gent, Academiejaar: 2001-2202 Vakgroep Elektronica en Informatiesystemen.

Kaura, Mary A., et al., "Optical correlator performance using a phase-with-constrained-magnitude complex spatial filter," Applied Opitcs, vol. 29, No. 17, Jun. 10, 1990, pp. 2587-2593.

Kato, Makoto, "Speckle reduction in Holography with a Spatially Incoherent Source," Applied Optics, May 1975, vol. 14, No. 5, pp. 1093-1099.

Handschy, Mark, "Semiconductor Manufacturing Techniques for Ferroelectric Liquid Crystal Microdisplays," Solid State Technology, vol. 43, pp. 151-161 (2000).

Bernal, Maria-P., Burr, Georffry W., Coufal, Hans, Hoffnagle, John A., Jefferson, C. Michael, Macfarlane, Roger M., Shelby, Robert M., and Quintanilla, Manuel, "Experimental Study of the Effects of a Six-Level Phase Mask on a Digital Holographic System," Applied Optics, vol. 37, pp. 2094-2101 (1998).

Ashley, J., Bernal, M.P., Burr, G.W., Coufal, H., Guenther, H., Hoffnagle, J.A., Jefferson, C.M., Marcus, B., Macfarlane, R.M. Shelby, R.M., Sincerbox, G.T., "Holographic Data Storage," IBM J. Res. Devlop., vol. 44, No. 3, May 2000.

O'Callaghan, Michael J., "Switching Dynamics and Surface Forces in Thresholdless 'V Shaped' Switching Forrelectric Liquid Crystals," Physical Review E, vol. 67, Paper 011710 (2003).

Salmio, Risto Pekka, Saarinen, Jyrki, Turunen, Jari, Tervonen, Ari, "Graded-Index Diffractive Elements by Thermal Ion Exchange in Glass," Appl. Phys. Lett. 66, vol. 8, Feb. 20, 1995, pp. 917-919.

* cited by examiner

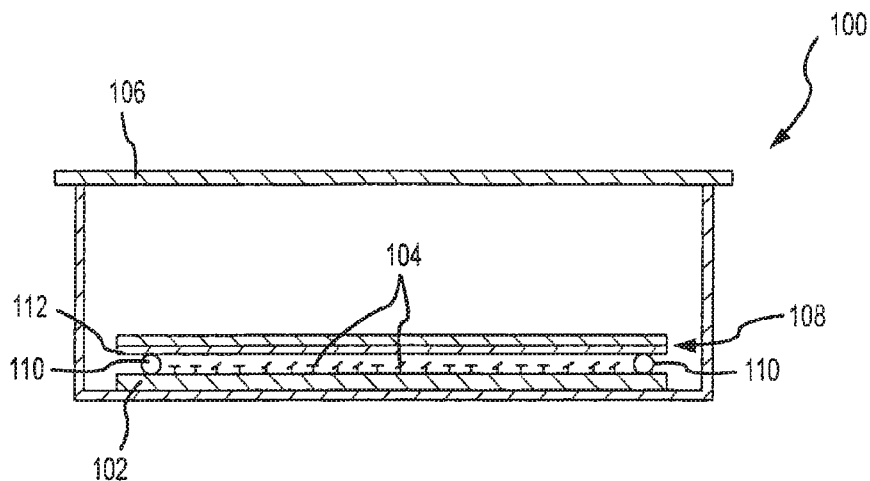
FIG.6
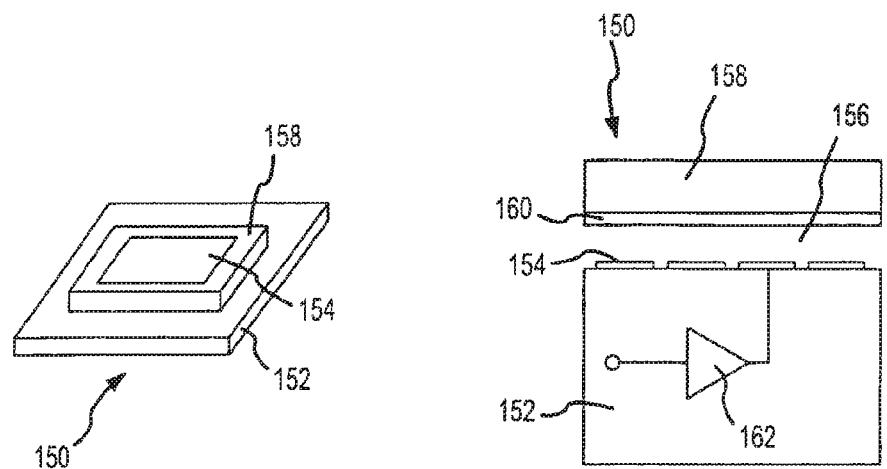
FIG.8
FIG.9

PHASE MASKS FOR USE IN HOLOGRAPHIC DATA STORAGE

CROSS-REFERENCE TO RELATED APPLICATIONS

This application is a divisional of U.S. patent application Ser. No. 11/046,197 filed Jan. 27, 2005 entitled "Phase Masks for Use in Holographic Data Storage," which claims priority from U.S. Provisional Patent Application Nos. 60/539,620 filed Jan. 27, 2004, entitled "FLC SLMs for Holographic Data Storage Writeheads" and 60/540,737 filed Jan. 30, 2004, entitled "Technologies for Holographic Data Storage", the contents of each of which are incorporated herein by reference.

FIELD

The embodiments of the present invention disclosed herein relate generally to holographic data storage (HDS), and more particularly to spatial light modulator (SLM) write heads for HDS and the use of phase masks therein.

BACKGROUND

Holographic optical data storage is an attractive alternative to magnetic tape, magnetic disc, and optical disc storage of digital computer data. It offers high capacity and high recording and reading data rates on storage media that can be removed from the drive, as described in *Holographic Data Storage*, H. J. Coufal, D. Psaltis, G. T. Sincerbox, editors, (Springer-Verlag, Berlin, 2000), incorporated herein by reference. Data to be stored is written to a photosensitive storage media by overlapping an information-bearing light beam (the signal beam) with a reference light beam. When the beams are coherent, coming for example from the same laser, standing waves in the beam's interference pattern create changes in the photosensitive material's index of refraction, thus forming a hologram. The stored data can be read out by illuminating the recorded hologram with the reference beam alone: the hologram diffracts light from the reference beam to create a copy of the original information-bearing beam. Multiple holograms can be recorded within the same volume of storage media by, for example, varying the angle of the reference beam. This is known as angular multiplexing. Many other hologram-multiplexing techniques are known in the art. The use of volumetric storage enables extremely high capacities, and the parallelism inherent in page-oriented storage offers much higher data rates that conventional serial bit-at-a-time technologies.

The information to be recorded or stored is imposed on the light beam through the use of a spatial light modulator (SLM). The SLM converts input electronic data to a two-dimensional image of bright and dark pixels, for example. Light modulated by the SLM passes through the optical system of the HDS device or drive to be recorded within the storage medium. In some instances, the SLM may modulate the phase (rather than the intensity or amplitude) of the light. Typically, a lens between the SLM and the recording medium is used to form a spatial Fourier transform of the SLM image in the region where the hologram is to be recorded in the photosensitive material of the storage medium. Subsequently, when it is desired to read the data stored in the medium, the hologram stored in the recording medium is illuminated by the reference beam to reconstruct the SLM image, which can then be detected by a photodetector such as a CCD camera. One example of an SLM suitable for holographic data storage systems can be made using ferroelectric liquid crystals (FLCs) atop a CMOS backplane, constructed similarly to the microdisplay devices described in U.S. Pat. Nos. 5,748,164 and 5,808,800, the contents of which are incorporated herein by reference. These SLMs can be fabricated by techniques that are well known in the art, for example as described in "Semiconductor manufacturing techniques for ferroelectric liquid crystal microdisplays," by Mark Handschy in Solid State Technology volume 43, pages 151-161 (2000), incorporated herein by reference.

However, several difficulties in the implementation of a practical holographic data storage system can be traced to the design and performance of the signal-beam optical path. Also, the particular FLC SLM devices described in the above-mentioned patents do not make ideal write-heads. For example, when the SLM is operated as an intensity modulator, its Fourier transform contains a bright central spot, the DC spot, that is as much as 60 dB (one million times) brighter than the surrounding light intensity. This bright spot can saturate the optical recording medium, making it difficult to record and reconstruct data with high fidelity.

It is known in the art that the Fourier-plane DC bright-spot problem can be solved by introducing into the optical system a phase mask that imposes fixed, pseudo-random optical phase variations across the wave front. However, it is also recognized in the art [see, for example, U.S. Pat. No. 6,281,993, column 1 line 65 through column 2 line 4; or Maria-P. Bernal, Geoffrey W. Burr, Hans Coufal, John A. Hoffnagle, C. Michael Jefferson, Roger M. Macfarlane, Robert M. Shelby, and Manuel Quintanilla, "Experimental study of the effects of a six-level phase mask on a digital holographic system," Applied Optics vol. 37, pp. 2094-2101 (1998), the contents of each of which are incorporated herein by reference] that the phase-mask image must be imaged onto the SLM, and that the phase-mask image must be very precisely aligned with the SLM (pixels in the mask must line up with pixels of the SLM image). The phase mask and its associated relay imaging optics adds to the size and cost of the drive's optical system, especially because of the precision optomechanics needed for micron scale alignment of the mask image to the SLM.

A crude attempt to eliminate the need for a separate relay lens to image the SLM onto the phase mask is described in the abovementioned book (Coufal, Psaltis, and Sincerbox, editors), in which Zhou, Mok and Psaltis disclose (p. 249) bonding a phase mask onto the exterior of a Kopin nematic liquid crystal SLM microdisplay to make an SLM for their holographic data storage system. They fabricated the phase mask as an array of lenslets having the same layout pitch as the pixel pitch of the SLM, each lenslet recessed into the substrate by a random choice of one of four different amounts, corresponding to the phase delays of $0, \pi/2, \pi,$ and $3\pi/2$. The lenslet substrate was then bonded onto the outside of a completed transmissive liquid-crystal microdisplay.

In this design, the phase mask function is provided by the different recess depths. The function of the lenslets is to focus the light passing through the area of a given recess onto the corresponding pixel aperture. Since the construction of the nematic liquid crystal SLMs requires glass substrates nearly 1 mm thick, the recess relief pattern is at least this distance away from the plane of the pixel apertures. With desired pixel pitches in the range of 10-20 the light passing through a pixel of the phase mask would, without the benefit of the lenslet, have undesirably spread to pass through many liquid crystal pixels by the time it had traversed the thickness of the SLM substrate. However, due to diffraction, the ability of small-diameter lenslets to focus light to a small spot on a plane a large distance away is limited. Usual Gaussian-beam optics dictate that the smallest spot the lenslet can focus a beam to has a diameter $d=(4\lambda/n\pi)(F/D)$, where F and D are respectively the focal length and diameter of a lenslet, $\lambda$ is the optical wavelength, and n is the window's index of refraction. The lenslet diameter D could be no larger than the pixel pitch p, and to focus the light on the plane of the pixels, lenslet focal length F would be set equal to the thickness of the glass substrate. According to these relations, the thickest glass substrate that can be accommodated has a thickness $F=(\pi/4)(np^2/\lambda)$. Even closer spacing between the pixels and the lenslet plus phase mask than indicated by this equation may in fact be necessary to yield adequate image fidelity. For a typical SLM pixel pitch $p=12$ µm, and for light wavelength $\lambda=0.5$ µm, this approach of placing a phase mask on the outside of the SLM substrate of refractive index $n=1.5$ can only be effective if the substrate thickness is substantially less than 340 µm. It is impractical to industrially manufacture SLMs using glass substrates so thin and fragile.

It is against this background and with a desire to improve on the prior art that the techniques disclosed herein have been developed.

BRIEF DESCRIPTION OF THE DRAWINGS

FIG. 6 is a side view of portions of a DMD SLM constructed according to an embodiment of the present invention, showing an integral phase mask.

FIG. 8 is a perspective view of an SLM including a phase mask.

FIG. 9 is a schematic side view of portions of the SLM of FIG. 8, showing a 3-state driver for the pixel electrodes.

DETAILED DESCRIPTION

Reference will now be made to the accompanying drawings, which assist in illustrating the various pertinent features of the embodiments of the present invention. Although these embodiments of the present invention will now be described primarily in conjunction with holographic data storage applications, it should be expressly understood that the present invention may be applicable to other applications where altering an image with a phase mask is required/desired. In this regard, the following description of an improved holographic data storage system is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
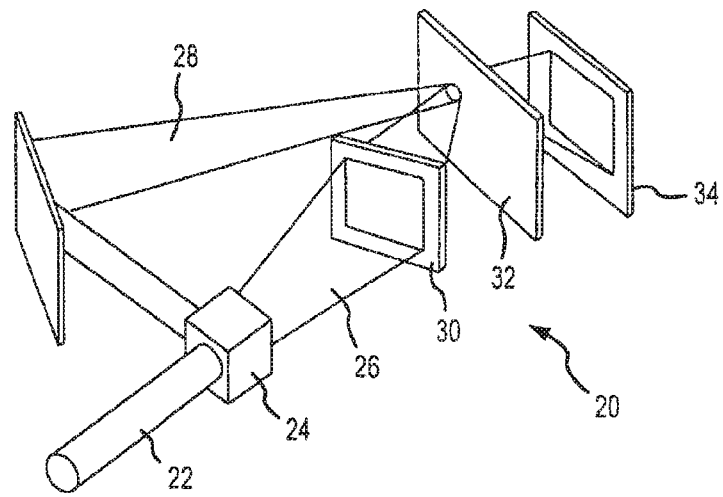
FIG. 1 is a perspective view of a holographic data storage system.

FIG. 1 shows the optical arrangement of a holographic data storage system 20 according to one embodiment of the present invention. As can be seen, a beam 22 from a coherent light source, such as a laser, is split by a beamsplitter 24 into two beams, a signal beam 26 and a reference beam 28. The signal beam 26 is directed toward a spatial light modulator 30, such as a ferroelectric liquid crystal modulator as exemplified by those produced by Displaytech, Inc. of Longmont, Colo. Alternatively, the spatial light modulator (SLM) could be any other suitable type of SLM whether ferroelectric liquid crystal or other type of liquid crystals, such as nematic liquid crystal, or a MEMS (MicroElectroMechanical System) device such as a digital micromirror device (DMD) such as those produced by Texas Instruments under the trademark DLP, or other MEMS device, or any other suitable SLM such as a semiconductor multiple quantum well (MQW) SLM.

One of the reference beam 28 and the signal beam 26 (in this case the reference beam) is directed off-axis where it is then re-directed toward an optical storage medium 32, that may be composed of any suitable photosensitive material (such as a photorefractive crystal or a photopolymer like those available from InPhase Technologies, Inc. in Longmont, Colo. or from Aprilis, Inc. in Cambridge, Mass.). The light from the signal beam 26 is modulated by the SLM 30 (operating in transmission or reflection) and directed to the same point in the storage medium 32 as well. After modulation by the SLM, the signal beam 26 inteferes with the reference beam 28 within the optical storage medium 32 to form a three-dimensional hologram, representative of all the data displayed by the SLM 30. This is the process that is followed to write data to the storage medium 32 with the holographic data storage system 20. The stored hologram may be representative of an image or of a page of data. As can be appreciated with an SLM having an array of 1000 by 1000 pixels, 1,000,000 bits of data can be stored in each hologram.

In order to read data from the storage medium 32 with the holographic data storage system 20, the signal beam 26 and spatial light modulator 30 are not needed and the reference beam 28 alone illuminates the hologram. A detector 34, which may be in the form of a detector array, may be located on the opposite side of the storage medium 32 to read the image that is produced when the hologram is illuminated by the reference beam 28. In this manner, the image can be read back to either display the image or to read the data bits stored in that page of data. As can be appreciated data can be read back much faster than in one-bit-at-a-time optical storage systems like CD-ROM drives.

Figure 2:
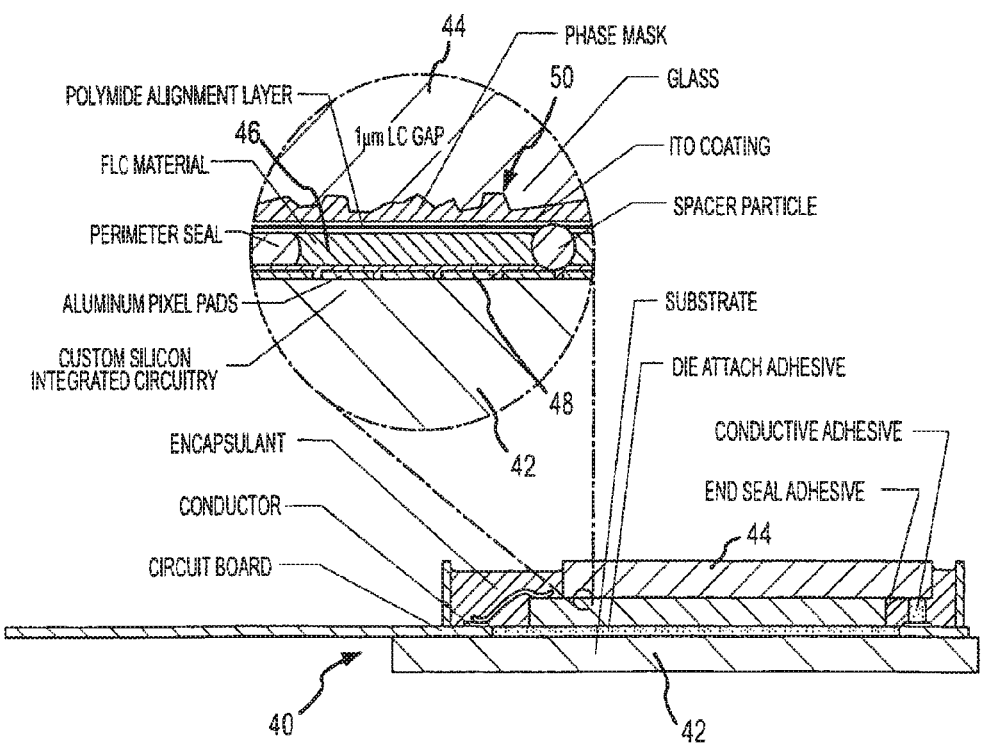
FIG. 2 is a side view of an SLM constructed according to an embodiment of the present invention, with a portion thereof magnified to show greater detail.

FIG. 2 shows a spatial light modulator 40 according to one embodiment of the present invention. In the manner of the SLMs disclosed in the previously mentioned FLC microdisplay patents, this SLM 40 comprises a silicon integrated-circuit backplane 42 and a glass window 44, with a thin film 46 of liquid crystal sandwiched between the backplane 42 and the window 44. Although the embodiments described primarily relate to reflective SLMs, the inventions herein are equally applicable to transmissive SLMs. Metal pads 48 on the upper surface of the integrated circuit 42 serve both as mirrors defining reflective pixels and as electrodes to drive the associated liquid crystal material in the film 46. Integrated circuitry under the mirror electrodes (metal pads) 48 supplies electrical drive to each of the pixels. The window 44 incorporates a phase mask 50 adjacent to its inner surface, that is, adjacent to the window surface that faces the integrated circuit 42 and that is in contact with the film 46 of liquid crystal material. The phase mask 50 can be fabricated by any of a number of techniques, such as those we describe further below. In this embodiment the phase mask 50 is fabricated in such a way that the window inner surface remains flat and smooth so that the liquid crystal cell gap thickness can be constant and uniform within a pixel and from a pixel with one phase shift to another pixel with a different phase shift.

The phase mask 50 is located close to the window inner surface, according to the guidelines expounded below, to facilitate creation of sharp, high-fidelity images of the SLM pixel array. If the phase mask 50 were to be moved away from the pixel plane, its phase variation would cause light emanating from one pixel to be imaged to the position of adjacent pixels, blurring the image exactly in the same manner that a frosted-glass window prevents a viewer from clearly seeing objects on the other side of the window. Preferably, the phase mask 50 is close enough to the pixels that both the phase mask's structures and the pixels can simultaneously be focused by the imaging optics, i.e. the phase mask 50 and the pixels are spaced closely enough that both lie within the depth of focus or depth of field of the imaging optics. Fabricating an SLM with a phase mask-to-pixel spacing this close may, however, be somewhat difficult, especially if the imaging optics have a relatively large numerical aperture (NA). A slightly relaxed spacing criterion requires that the phase mask be close enough to the pixels that the resolution of the pixel image is not degraded past the point where the pixels can still be resolved (even if the imaging optics might otherwise have resolution much better than needed to resolve a pixel). This spacing can be estimated from the distance at which the bundle of those light rays emanating from the center of a given pixel that will eventually be collected by the imaging optics have spread to a spot size as big as the pixel. This distance L depends on the acceptance angle θ of the imaging optics, according to the following relation:

$$L = p/(2 \tan \theta), \quad (1)$$

where p is the SLM pixel pitch and θ is the optical system acceptance half-angle. Imaging optics with a small acceptance angle have a large depth of focus, which allows the phase mask to be placed farther away from the pixel plane, perhaps making the SLM with integrated phase mask easier to fabricate. However, the wave nature of light causes the resolution of the optical system to become worse as the acceptance angle is reduced. According to the Abbe criterion, the optical system is just able to resolve a pixel when:

$$NA = n \sin \theta = \lambda/(2p), \quad (2)$$

where the optical system numerical aperture NA is defined by the refractive index n of the SLM window and the half-angle θ of the cone of light rays in the SLM window that eventually fill the optical system's aperture. To ensure a sharp reconstructed image, it may be desirable to pass a multiple m≧1 of the SLM's spatial harmonics (typically m≦3), in which case the above resolution criterion becomes:

$$NA = n \sin \theta = m\lambda/(2p). \quad (3)$$

For an optical system at the limiting numerical aperture given by equation (3), the maximum spacing L between the phase mask and the SLM pixels according to equation (1) in the small angle limit (sin θ=tan θ) becomes:

$$L = (n/m)p^2/\lambda. \quad (4)$$

For typical values of p=12 μm, λ=0.5 μm, n=1.5, and m=1.2, this limiting spacing becomes L=360 μm. To further limit image degradation produced by the phase mask, it is highly preferable to place the phase mask even closer to SLM pixels; for example, twice as close, requiring a phase mask-to-SLM pixel spacing less than about 200 μm.

The exact value of the preferred maximum acceptable spacing L depends on the particular values of numerical factors like n and m, and on a variety of details of the operation' of the holographic data storage system which vary from a system of one design to a system of another design. For these reasons the values of L given above are estimates only; but, in any case, the maximum acceptable value of L will scale as $p^2/\lambda$, and will take values close to 200 μm for holographic data storage systems operating at λ=0.5 μm with SLMs having pixel pitch p=12 μm. The costs of making SLMs like those described in the above-referenced microdisplay patents increase rapidly with pixel pitch, as do many of the costs of the holographic data storage optical system. Hence, there is a strong motivation to reduce p below today's typical values around 12 μm. Thus, future SLMs made according to the present invention, but with smaller pixel pitches, will require phase masks much closer than 200 μm to the pixel plane. For example, if an HDS system with a 12-μm-pitch SLM required the phase mask be within 200 μm of the pixel plane, a system with similar characteristics, but with 6-μm-pitch SLM would require the phase mask be within 50 μm of the pixel plane.

Disclosed herein are techniques for fabricating SLMs with integrated phase masks positioned close enough to the SLM pixel plane to allow reconstruction of high-fidelity images of the SLM while alleviating the Fourier-plane DC bright-spot problem, both for SLMs of today's typical 12 μm pixel pitches, and for future SLMs with substantially reduced pixel pitch.

Figure 3:
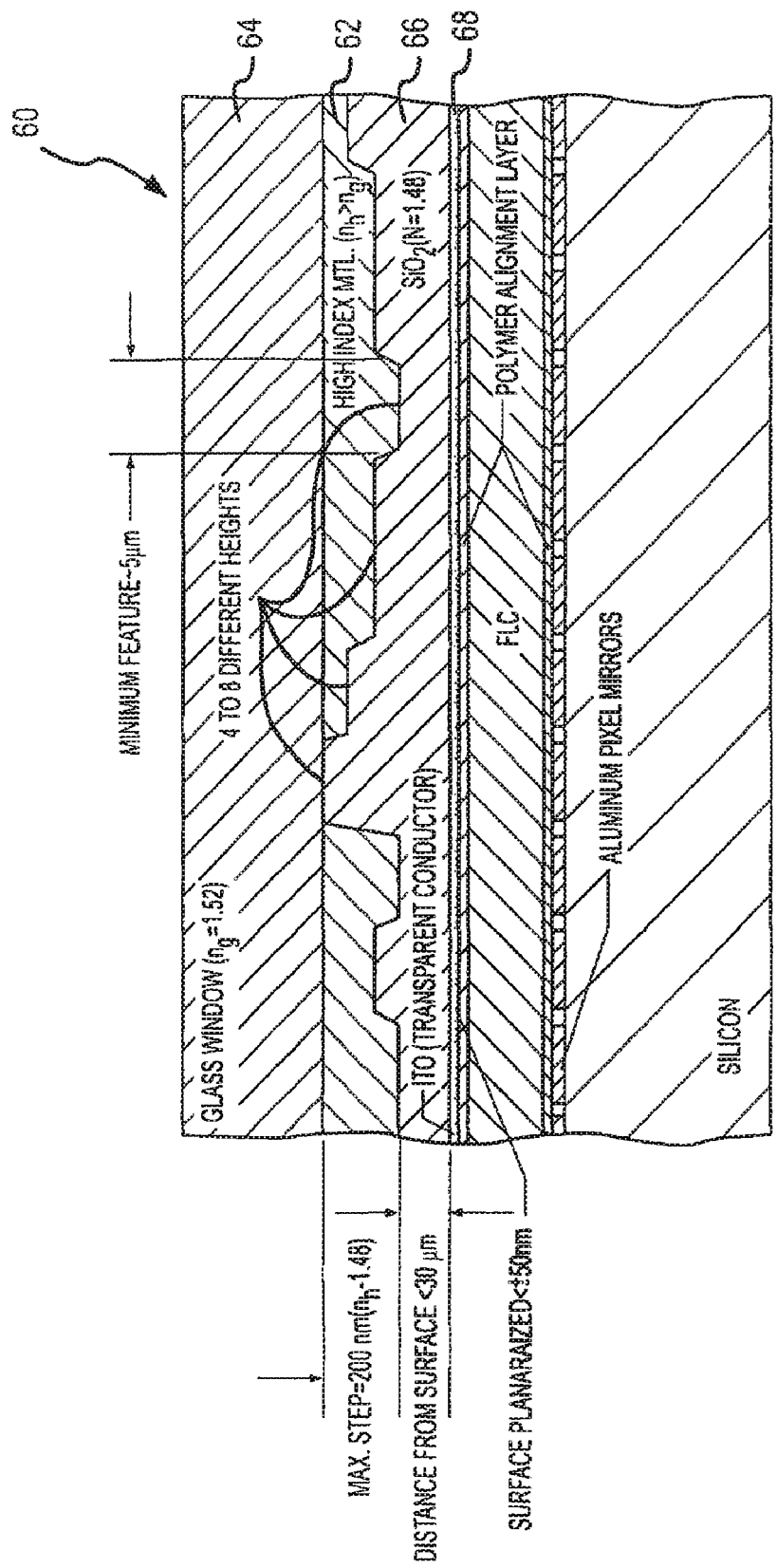
FIG. 3 is a side view of portions of an SLM constructed according to an embodiment of the present invention, showing an integral phase mask created with adjacent multilevel layers of material having different indexes of refraction.

For the SLM 40 of the embodiment illustrated in FIG. 2, a first method for fabricating a phase-mask window 60 is described with reference to FIG. 3. A film 62 of high refractive index material like $TiO_2$ (n=2) is deposited on a glass wafer 64 suitable for making the SLM window. Standard evaporation, chemical vapor deposition (CVD), ion beam sputtering, or sol-gel spin-on techniques can be used to deposit $TiO_2$ films [see, for example, N. Ozer, H. Demiryont and J. H. Simmons, "Optical properties of sol-gel spin-coated $TiO_2$ films and comparison of the properties with ion-beam-sputtered films," Applied Optics volume 30, page 3661 (1991), the contents of which are incorporated herein by reference]. Other materials useful for making high-index coatings include SiN, $Ta_2O_5$, $HfO_2$, $ZrO_2$, and $Nb_2O_5$. The thickness of this high-index film 62 is then patterned, for example by photolithographic etching, to form a prescribed optical phase shifting structure. Binary phase masks can be made by depositing a uniform high-index film of appropriate thickness (say, thickness about equal to 200 nm for a $TiO_2$/glass structure operating at λ=400 nm), and then etching portions of it away, down to the underlying glass wafer. Alternately, multilevel phase masks can be made by patterning the high-index film using gray-scale photolithography, or by the technique known in the art of successively depositing and patterning a sequence of films of different thicknesses. A particularly simple technique for making titania patterns is disclosed in U.S. Pat. No. 6,303,270, the contents of which are incorporated herein by reference. Optional antireflection coatings (typically of a material of intermediate refractive index such as alumina) on either side of the $TiO_2$ would reduce unwanted reflections. After the high index film 62 is deposited and an appropriate relief pattern is formed, the relief is planarized by overcoating the high-index structure with a lower-index film 66, for example a film made of $SiO_2$ (n=1.46). The $SiO_2$ could be deposited again by CVD, by evaporation, or by any of the many other techniques known in the art. The low-index material should have a thickness at least equal to the peak-to-valley height of the high-index relief structure. Then, to remove any residual relief, the surface of the low-index film 66 is planarized, for example by a polishing step like the chemical-mechanical planarization (CMP) process practiced routinely in the silicon VLSI industry. Alternatively, the low-index material could be deposited as a spin-on glass (SOG), which deposition process intrinsically produces planarization. The thicker the low-index film 66 compared to the relief height, the higher the degree of planarization. The thickness of the low-index film 66 should not be increased, however, past the point where its thickness exceeds the guidelines given above for the phase-mask to pixel spacing.

After phase-mask fabrication and planarization, the glass wafer 64 is coated, on the surface closest to the phase mask, with a transparent conductive layer 68, such as indium-tin-oxide. The wafer 64 with the embedded planarized phase mask (the phase mask window 60) can then be substituted for the previously used simple glass wafers or windows, and the SLM fabrication process completed according to the techniques described in the aforementioned microdisplay patents and articles. Transparent wafer 64 can equally well be substituted in the processes for making transmissive SLMs, such as transmissive liquid crystal SLMs like those made by Kopin Corporation of Taunton, Mass. or other AMLCD type devices There are many variations of the techniques described above for fabricating SLMs with a phase mask integrated into their window. For example, the roles of the low-index and high-index films can be reversed, that is, the low-index film could be deposited on the glass substrate and patterned to have the appropriate relief, which is then filled in by the high-index coating and planarized. Since an ordinary glass wafer already provides a low-index material, the relief structure could alternatively be etched directly into the glass wafer, and then filled in by a high-index coating and planarized. As a further alternative, a high-index material could be substituted for the ordinary glass substrate. For example, sapphire or SF6 glass could be used. Then, the relief profile could be etched directly into the high-index substrate, allowing it to be filled in and planarized by a low-index material such as $SiO_2$. Polymeric materials can also be utilized as low-index and high-index coating materials. PMMA (polymethylmethacrylate) dissolved in chlorobenzene is an example spin-coatable material useful for making low-index films. High-index polymeric films can be made, for example, from hybrid polymer/metal-oxide materials, such as those provided by Brewer Science (Rolla, Mo.). Selected polyimides, such as T-Polyim, also provided by Brewer Science, can serve as high-index coatings. $TiO_2$ has sufficient refractive index contrast to $SiO_2$ to give $2\pi$ phase shift (double-pass reflective geometry) in a layer 400 nm thick.

Figure 4:
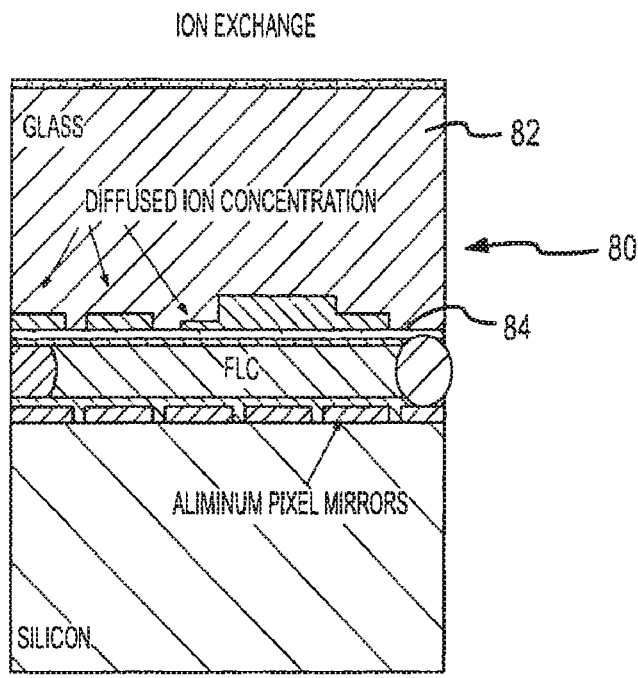
FIG. 4 is a side view of portions of an SLM constructed according to an embodiment of the present invention, showing an integral phase mask created with an ion exchange technique.

A second method for fabricating a SLM phase mask window 80 is described with reference to FIG. 4. This second method relies on a variation of the ion-exchange techniques used to make planar waveguides [see, for example, S. D. Fantone, "Refractive index and spectral models for gradient-index materials," Applied Optics volume 22, page 432 (1983), the contents of which are incorporated herein by reference]. A glass wafer 82 is soaked in a molten salt bath; ions of one kind (Na+) diffuse out of the glass into the bath, while ions of another kind (K+ or Ag+) diffuse from the bath into the glass, changing its refractive index. Refractive index changes of 0.007 suffice to give a $2\pi$ phase shift within 30 μm (double pass) of the glass surface that will be placed adjacent to reflective SLM pixels. Prior to being placed in the molten salt bath, the side of the glass wafer 82 that will ultimately bear the phase mask is coated with a thin layer of a material such as aluminum that serves as a barrier to the diffusion of the ions. This barrier layer is patterned into a diffusion mask by etching holes through the layer at locations where ion diffusion is desired. The spatial profile of the refractive-index variations can be controlled through appropriate design of the density, size, and shape of the holes in the barrier layer. Further control is obtained through the temperature of the molten-salt bath and the duration of the soak. The soak can be broken up into multiple periods, with the diffusion masks replaced by a new one of a different pattern between each soak period. After the ion-diffusion process is complete, the diffusion-mask is removed.

If the spatially varying ion-diffusion process has caused the surface of the glass wafer to become uneven, it can be re-polished flat. It may be desired, especially for use in liquid-crystal SLMs, to coat the ion-diffused glass wafer with a transparent diffusion barrier such as a thin layer of $SiO_2$, to ensure that during use none of the ions diffuse out of the window into the liquid crystal material. After coating the phase-mask side of the wafer 82 with a transparent conducting coating 84 such as indium-tin oxide, the glass wafer 80 (now the phase mask window 80) is ready for fabrication into SLMs (whether transmissive or reflective) according to the previously referenced techniques.

Figure 5:
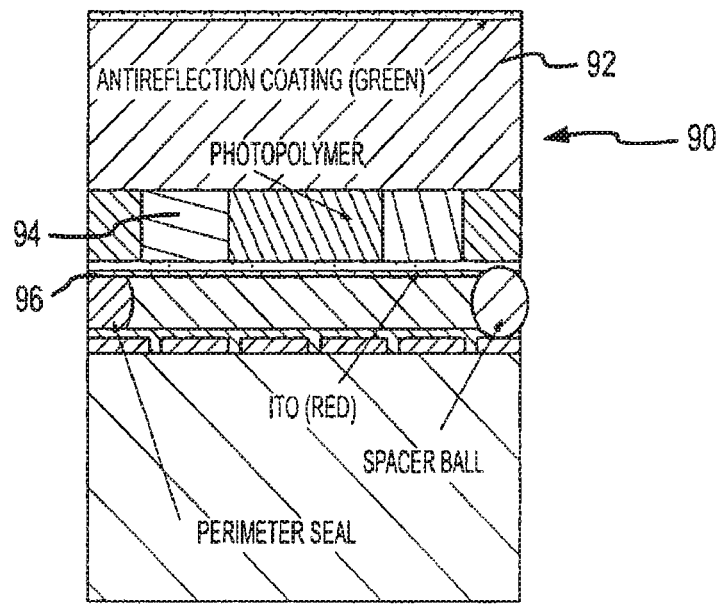
FIG. 5 is a side view of portions of an SLM constructed according to an embodiment of the present invention, showing an integral phase mask created with a photopolymer layer that has been exposed to patterned light.

A third method for fabricating a SLM phase-mask window 90 is described with reference to FIG. 5. A glass wafer 92 is coated with a photopolymer 94 and then exposed to a pattern of light to make a random or specific index-of-refraction pattern. Suitable photopolymers include conventional photoresists as well as photopolymers intended for recording holograms such as those disclosed in U.S. Pat. Nos. 6,103,454, 6,221,536, and 5,759,721, the contents of each of which are incorporated herein by reference. After placing the photopolymer layer 94 onto the wafer 92 (before or after laser writing), the photopolymer 94 is overcoated with a transparent conducting coating 96 such as indium-tin oxide, possibly with an intervening barrier layer (e.g. $SiO_2$). The glass wafer is then ready for fabrication into a variety of SLM types according to the previously referenced techniques.

As an alternative, a further innovation that could be implemented is the use of novel, shift-invariant phase masks that do not require precise alignment with SLM pixels, thus further decreasing cost.

FIG. 6 shows a phase mask provided as an integral part of a DMD device 100, according to the teachings of another embodiment of the present invention. A substrate 102 includes a pixellated array of micromechanical mirrors 104 that can be controlled to reflect light in one of two or more selected directions, as is well known. As may be conventional, the substrate 102 is attached to a package housing 104 with an upper opening that is covered by a protective transmissive window 106. In a novel fashion, another transmissive window 108 is attached to the substrate in close vicinity to the array or micromirrors 104 by an adhesive 110 or by other suitable fixing means such as a braze or frit. This transmissive window 108 includes a phase mask 112 provided thereon to spatially vary the phase of the light passing therethrough. The phase mask 110 need not necessarily be planarized since, unlike the case with liquid crystals, there may be no compelling reason to have the inner surface of the phase mask window 108 be planar. Light can be directed from above through the protective window 106 and through the phase mask window 108 to reflect off of the array of micromirrors and pass back through the two windows 106 and 108. As can be appreciated, if one were to purchase a commercially available DMD device and attempt to apply a phase mask thereto, one would have to attach the phase mask to the exterior of the protective window 106 or locate the window at some further away location. This is certainly going to be too far away from the pixel plane to achieve the desired results.

Figure 7:
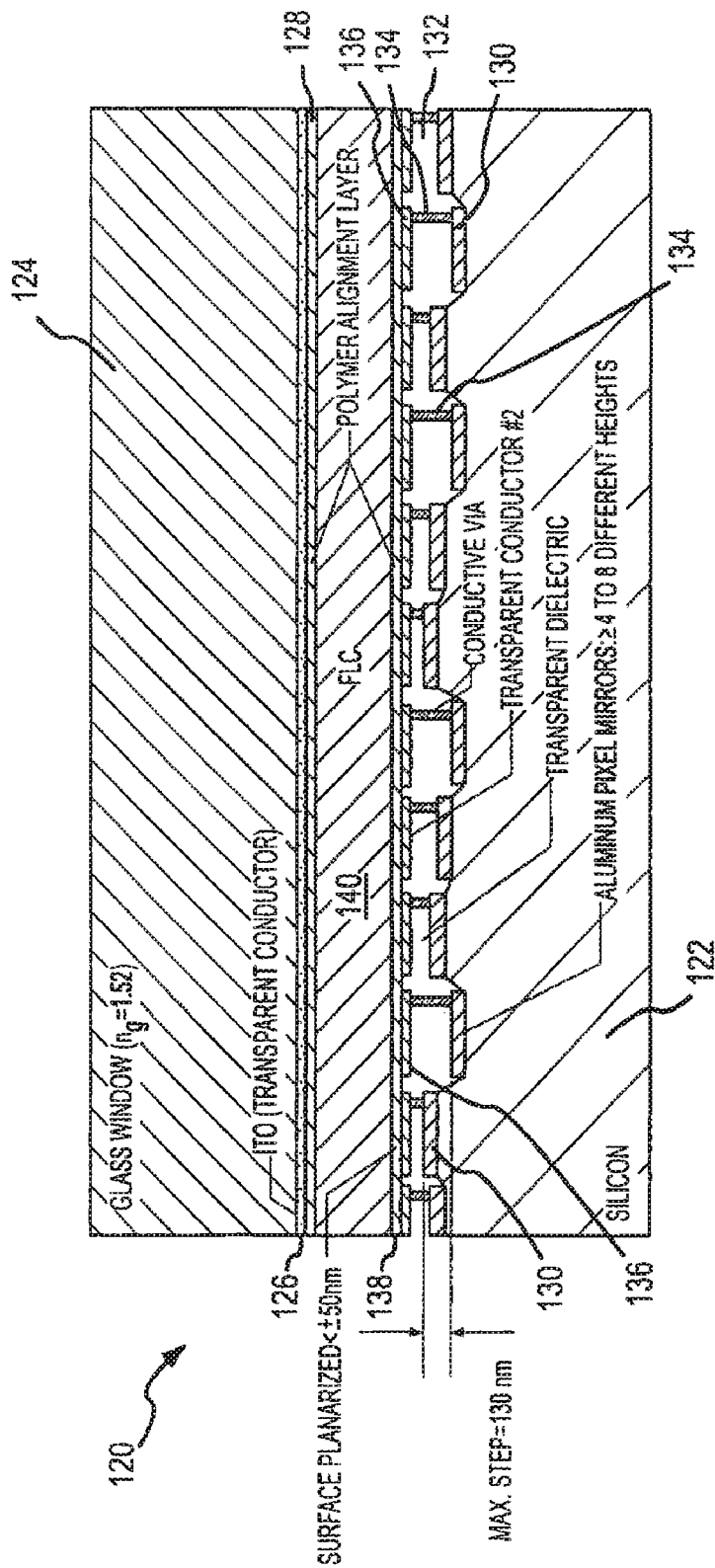
FIG. 7 is a side view of portions of an SLM constructed according to an embodiment of the present invention, showing an integral phase mask created in the silicon substrate by placing the pixel mirrors at one of multiple levels.

FIG. 7 shows an alternative approach to providing a phase mask according to another embodiment of the present invention. Although this approach is described for a liquid crystal SLM, it is equally applicable to any other type of SLM, including MEMS devices such as DMDs. Liquid crystal SLM 120 includes a silicon substrate 122 and a glass window 124. The glass window 124 has a transparent conductor 126 (e.g., composed of ITO) on a side thereof facing toward the silicon substrate 122. As is conventionally used in these types of SLMs, a polymer alignment layer 128 may be applied to the transparent conductor 126. A liquid crystal material 140 fills the gap between the two substrates.

The silicon substrate 122 includes a multilevel surface that is covered with reflective pixel mirrors 130 (e.g., composed of aluminum). The mirrors 130 are at different heights relative to each other, providing phase differences between the light beams they reflect, and thereby implementing the phase mask function. The mirrors may be at various discrete heights (e.g., two, four, eight or more different heights). Optical phase differences between the light beams reflected from the various mirrors is produced in proportion to the height differences. For example, if the mirrors were at two different heights, it would be desirable to have a half-wave difference between beams reflected from a mirror at one height and a mirror at the other height. If the liquid crystal material had refractive index n=1.5, and the SLM were operating on light of wavelength $\lambda$=405 nm, a height difference t=$\lambda/(4n)$=68 nm between the two sets of mirrors would suffice. Phase shifts of up to a full wave could be produced with height differences between the mirrors ranging up to 135 nm (for the exemplary wavelength and refractive index). Given the relatively small values of the mirror height differences needed, the surface of the silicon substrate is still relatively smooth and planar, and could be used as-is in the fabrication of a liquid-crystal SLM. Alternatively, on top of the multilevel surface of slightly-spaced-apart mirrors 130, a layer of transparent dielectric 132 is applied, and then planarized, for example by CMP. Vias 134 are created through the dielectric 132 to each of the mirrors 130. On top of the layer of dielectric material 132, an array of transparent conductors 136 (acting as electrodes) are created. Each conductor 136 is conductively attached to its corresponding mirror 130 beneath by one of the vias 134. On top of the array of transparent conductors 136 a polymer alignment layer 138 may be provided.

Figure 10:
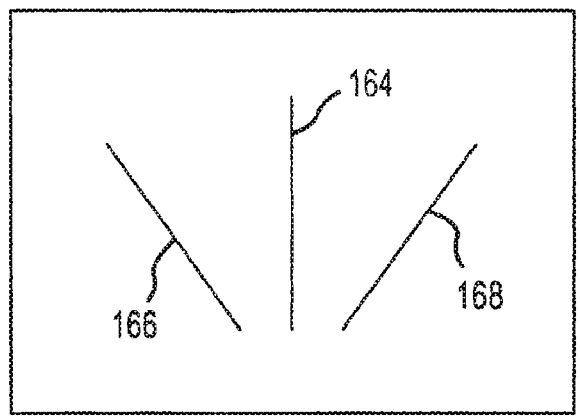
FIG. 10 is a view of the three optical states possible from the SLM of FIG. 8.

Another SLM 150 is shown in FIGS. 8-10. As shown in FIGS. 8 and 9, the SLM 150 includes a silicon chip 152 with an array of pixel mirrors/electrodes 154 defined thereon. A layer of FLC material 156 is sandwiched between the silicon chip 152 and a glass window 158, which may have an ITO transparent conductor layer 160 and an alignment layer (not shown). Another alignment layer (not shown) may be placed on top of the pixel mirrors/electrodes 154. A 3-state driver 162 for one of the pixel mirrors/electrodes 154 is shown in the silicon chip 152 in FIG. 9.

The three light modulation states are demonstrated in FIG. 10 in which the optic axis of the FLC is shown in each of the three different drive conditions (optic axes 164, 166, and 168). The at least three states include one state 164 of very low output light amplitude or intensity (the OFF state) and two other (ON) states 166 and 168 of high output intensity, at least two of which have different optical phase. This is referred to as ternary modulation, regardless of whether the total number of pixel optical states is three or more than three.

Figure 11:
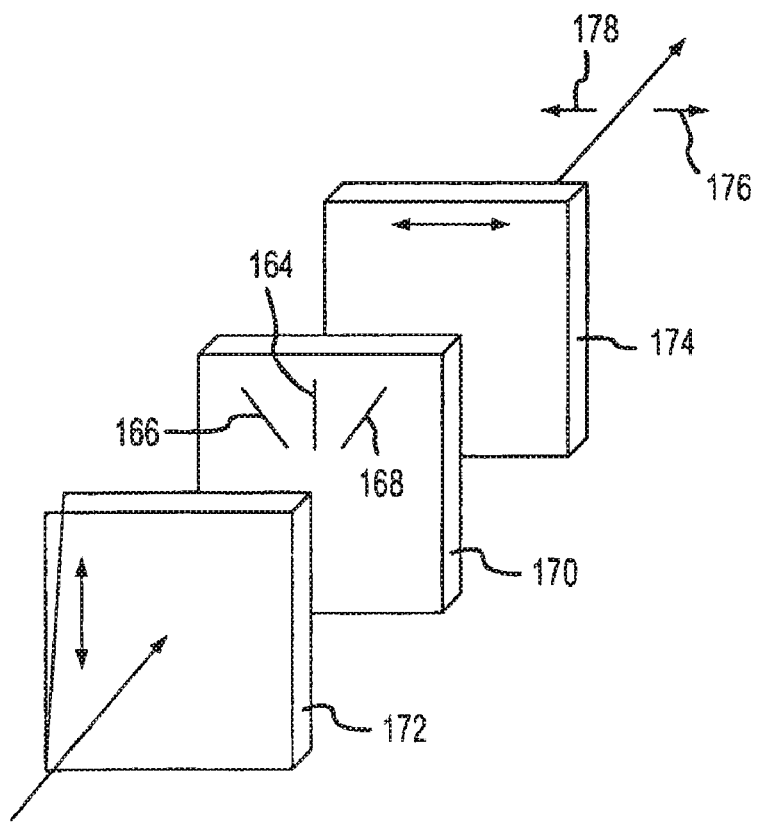
FIG. 11 is a schematic view of a polarizer, 3-state SLM, and analyzer.

This is illustrated more specifically in FIG. 11, in which the switchable FLC film 170 of an SLM pixel is oriented between crossed polarizers (a polarizer 172 and an analyzer 174) so that the FLC optic axis can be switched to either side of the incident light polarization direction. In the example shown here, the two FLC optic-axis orientations are equally disposed on either side of the incident polarization, the output light has the same intensity for each state, but opposite phase (that is, the phase of one output state is $+\pi/2$, and that of the other state is $-\pi/2$). The intensity of these two output states is maximized, as usual, when the SLM's FLC film 170 has half-wave total retardance—i.e. quarter-wave single-pass retardance for a reflective SLM. The output intensity is further maximized if the two FLC optic-axis orientations are fully 45° on either side of the input polarization. A third state of near-zero output intensity (an OFF state) can be obtained from an FLC optic-axis orientation substantially parallel to the incident polarization. Analog variation of FLC optic-axis orientation with applied electrical drive signal is known, for example, in the electroclinic effect, the deformable-helix effect, and in the so-called "V-shaped" switching effect [see, for example, Michael J. O'Callaghan, "Switching dynamics and surface forces in thresholdless "V-shaped" switching ferroelearic liquid crystals," Physical Review E, volume 67, paper 011710 (2003), the contents of which are incorporated herein by reference]. The three optic-axis states shown in FIG. 7 can then be obtained by applying three different levels of electrical drive to a pixel of an SLM having suitable analog response.

An SLM having at least the three optical states described with reference to FIG. 11 can solve the Fourier-plane DC bright-spot problem in a manner similar to that of the phase masks described above. Pixels where it is desired that the output intensity be zero are written with the electrical level that produces the OFF state having the FLC optic axis parallel to the incident polarization. Pixels that are desired to be ON can be written to either of the other two states described with reference to FIG. 11. The choice between the two ON states, the $+\pi$ state or the $-\pi$ state (hereinafter the +ON state and the −ON states, respectively), can be made in exactly the same way as the prescription for the design of a fixed phase mask.

Figure 12:
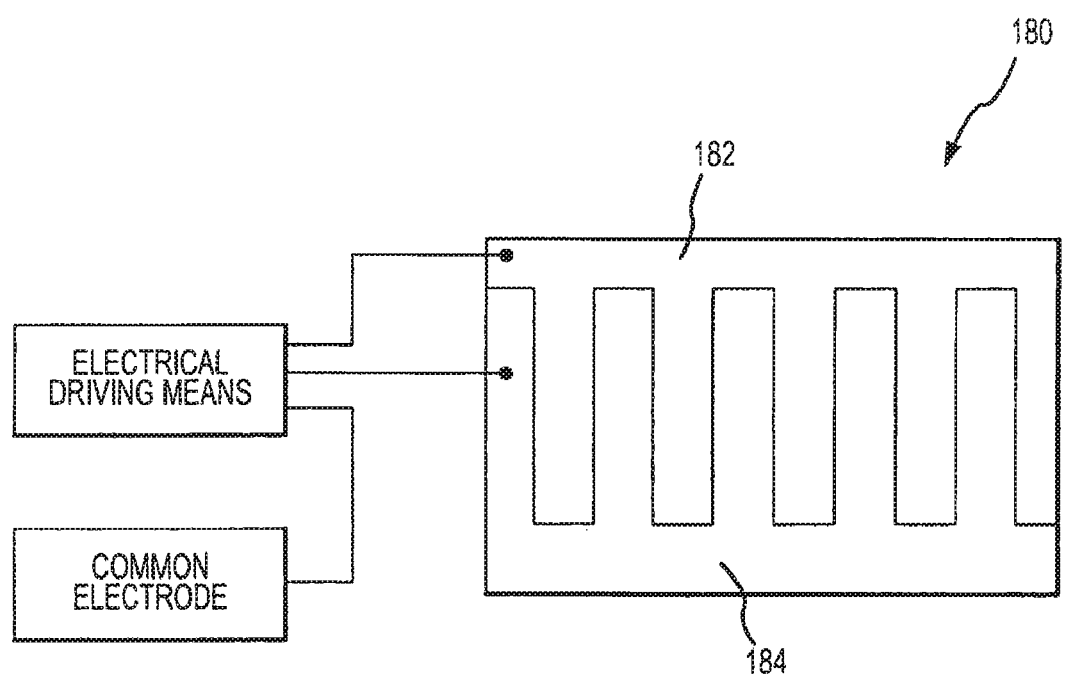
FIG. 12 is a schematic of another embodiment to achieve 3-state switching.

Another way to implement the three-state switching of the SLM described above is shown in FIG. 12. As has been previously disclosed in U.S. Pat. Nos. 5,182,665 and 5,552,916, the contents of which are incorporated herein by reference, switchable diffraction can be produced in conventional binary FLC devices, and used to modulate light. In fact, it can be used, as we disclose here, to produce combined phase and amplitude modulation in a way that allows such an SLM to function to reduce the Fourier-plane DC bright-spot problem in a way exactly analogous to that of those with fixed phase masks described above. Each pixel electrode 180 is divided into two interleaved segments, a segment 182 and a segment 184, as shown in FIG. 12, each segment having width q/2. For two signs of applied electrical drive, each pixel then has four states, as enumerated below.

| SEGMENT A | SEGMENT B | PIXEL STATE |
|-----------|-----------|-------------|
| + | + | +ON |
| − | − | −ON |
| + | − | OFF |
| − | + | OFF |

The first two columns of the table above show the polarity of the electrical drive applied by the segment electrodes to the overlying FLC. When positive drive voltage is applied to both segments, their FLC orientations are parallel, both lying on the same side of the incident polarization direction, producing the same +ON state as described above with respect to analog FLC phase modulators. When negative drive voltage is applied to both electrode segments, their FLC orientations are again parallel, but now both on the other side of the incident polarization direction, producing the same −ON state as described above for the analog FLC phase modulators. When voltages of opposite polarities are applied to the two segments, the associated FLC material is switched to have opposite optic axis directions, and a "grating" is produced. This grating will diffract at least part of the incident light, at angles that are larger than or equal to $\beta$, where $\sin \beta \sim \lambda/q$ according to the above-mentioned U.S. Pat. Nos. 5,182,665 and 5,552,916. By making the grating pitch small compared to the pixel pitch, the light can be diffracted completely out of an optical system whose aperture is limited to collect only the first few harmonics of the highest spatial frequency, $1/(2p)$, that can be written to the SLM, thereby producing a dark OFF-state image for pixels so driven.

As can be appreciated, many of the techniques taught herein deal with methods for constructing a phase mask that is sufficiently close to the pixel array. This is accomplished in most if not all of the embodiments described herein by constructing and placing the phase mask in an integral, internal position in the SLM. As is recognized is U.S. Pat. No. 6,281,993, it has heretofore been recognized that pixelated phase masks need to be placed in very close proximity or be imaged in very close proximity with the SLM to avoid deleterious effects. However, it has also been previously recognized that it is difficult and expensive to make and align such a system. The '993 patent goes on to propose the use of a non-pixelated axicon as a phase mask. Psaltis has proposed bonding a lenslet array on the outside of a liquid crystal microdisplay and, as discussed above, such an approach has severe drawbacks. Apparently, prior to the present invention, it has not been obvious to persons of skill in the art to place the phase mask in an integral, internal position within the SLM. Moreover, it has not been obvious how to provide a phase mask within 200 µm, within $p^2/\lambda$, or close enough to the pixel plane to allow the imaging system to resolve both the phase mask and the pixel plane.

Many different techniques and embodiments have been discussed herein, with some particularity. It should be understood, however, that the teachings herein can be combined in any combination, to achieve other embodiments that also fall within the scope of this invention.

The foregoing description of the embodiments of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A write head for a holographic data storage system, the write head comprising:
    a liquid crystal spatial light modulator that is arranged into an array of pixels that can each separately modulate light that is directed toward the spatial light modulator, wherein the spatial light modulator includes a layer of liquid crystal material sandwiched between two substantially planar surfaces, wherein one of the planar surfaces is on a substrate that includes a region of varying index of refraction that has been achieved by ion diffusion; and
    a phase mask that is capable of varying the phase of light passing therethrough, the magnitude of the phase variation being dependent on the particular portion of the phase mask that the light passes through;
    wherein the phase mask is provided on an interior surface of the spatial light modulator.

2. A write head as defined in claim 1, wherein the spatial light modulator is a ferroelectric liquid crystal spatial light modulator.

3. A write head as defined in claim 1, wherein one of the planar surfaces is on the inner surface of a layered, transmissive window, with one of the layers adjacent the inner surface includes the phase mask.

4. A write head as defined in claim 1, wherein the phase mask is located within 200 µm of the pixels of the spatial light modulator.

5. A write head as defined in claim 1, wherein the phase mask is within a distance d of the pixels of the spatial light modulator, where d is equal to $p^2/\lambda$, p is the pitch of the pixels of the spatial light modulator, and $\lambda$ is the wavelength of the light directed toward the spatial light modulator.

6. A write head as defined in claim 1, wherein the holographic data storage system has an imaging system, and wherein the phase mask is sufficiently close to the pixels of the spatial light modulator to allow the imaging system of the holographic data storage system to resolve both the phase mask and the pixels.

7. A write head as defined in claim 1, wherein the phase mask is pixellated.

8. A write head as defined in claim 1, wherein the phase mask is not pixellated.

9. A write head for a holographic data storage system, the write head comprising:
    a liquid crystal spatial light modulator that is arranged into an array of pixels that can each separately modulate light that is directed toward the spatial light modulator, wherein the spatial light modulator includes a layer of liquid crystal material sandwiched between two substantially planar surfaces, wherein one of the planar surfaces is on a layered substrate that includes a layer of photopolymer material that has been exposed to a pattern of light to make an index of refraction pattern; and
    a phase mask that is capable of varying the phase of light passing therethrough, the magnitude of the phase variation being dependent on the particular portion of the phase mask that the light passes through;
    wherein the phase mask is provided on an interior surface of the spatial light modulator.

10. A write head as defined in claim 9, wherein the spatial light modulator is a ferroelectric liquid crystal spatial light modulator.

11. A write head as defined in claim 9, wherein one of the planar surfaces is on the inner surface of a layered, transmissive window, with one of the layers adjacent the inner surface includes the phase mask.

12. A write head as defined in claim 9, wherein the phase mask is located within 200 μm of the pixels of the spatial light modulator.

13. A write head as defined in claim 9, wherein the phase mask is within a distance d of the pixels of the spatial light modulator, where d is equal to $p^2/\lambda$, p is the pitch of the pixels of the spatial light modulator, and $\lambda$, is the wavelength of the light directed toward the spatial light modulator.

14. A write head as defined in claim 9, wherein the holographic data storage system has an imaging system, and wherein the phase mask is sufficiently close to the pixels of the spatial light modulator to allow the imaging system of the holographic data storage system to resolve both the phase mask and the pixels.

15. A write head as defined in claim 9, wherein the phase mask is pixellated.

16. A write head as defined in claim 9, wherein the phase mask is not pixellated.

* * * * *

UNITED STATES PATENT AND TRADEMARK OFFICE
CERTIFICATE OF CORRECTION

PATENT NO. : 8,107,344 B2
APPLICATION NO. : 12/639821
DATED : January 31, 2012
INVENTOR(S) : Mark A. Handschy et al.

It is certified that error appears in the above-identified patent and that said Letters Patent is hereby corrected as shown below:

On the Cover page, item (75), in "Inventors", in column 1, line 3, delete "Boudler," and insert -- Boulder, --, therefor.

In column 14, line 1, in Claim 13, delete "λ," and insert -- λ --, therefor.

Signed and Sealed this
Twenty-seventh Day of March, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,107,344 B2 | Page 1 of 1 |
| APPLICATION NO. | : 12/639821 | |
| DATED | : January 31, 2012 | |
| INVENTOR(S) | : Handschy et al. | |

It is certified that error appears in the above-identified patent and that said Letters Patent is hereby corrected as shown below:

Column 4, line 41, delete "ineferes" and insert therefor --interferes--.

Signed and Sealed this
Eighth Day of May, 2012

David J. Kappos
*Director of the United States Patent and Trademark Office*